United States Patent
Liu et al.

(10) Patent No.: US 12,481,096 B1
(45) Date of Patent: Nov. 25, 2025

(54) LIGHT GUIDE PLATE AND LIGHT SOURCE DEVICE

(71) Applicant: CHAMP VISION DISPLAY INC., Miao-Li County (TW)

(72) Inventors: Chin-Ku Liu, Miao-Li County (TW); Chung-Hao Wu, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 19/082,117

(22) Filed: Mar. 17, 2025

(30) Foreign Application Priority Data

Sep. 30, 2024 (TW) .................. 113137329

(51) Int. Cl.
*F21V 8/00* (2006.01)
(52) U.S. Cl.
CPC .................. *G02B 6/004* (2013.01)
(58) Field of Classification Search
CPC ..................................... G02B 6/004
USPC ........................................ 362/606
See application file for complete search history.

(56) References Cited

U.S. PATENT DOCUMENTS

2008/0232135 A1    9/2008   Kinder et al.

FOREIGN PATENT DOCUMENTS

| CN | 205402403 | 7/2016 |
|---|---|---|
| CN | 117704305 | 3/2024 |
| JP | 2006075362 | 3/2006 |
| TW | 202212920 | 4/2022 |
| TW | 202424613 | 6/2024 |
| WO | 2016056345 | 4/2016 |
| WO | 2024122436 | 6/2024 |

OTHER PUBLICATIONS

"Notice of allowance of Taiwan Counterpart Application", issued on May 1, 2025, p. 1-p. 4.

*Primary Examiner* — Toan C Ly
(74) *Attorney, Agent, or Firm* — JCIPRNET (57) ABSTRACT

A light guide plate and a light source device including the light guide plate are provided. The light guide plate has a light incident surface and a first surface. The first surface has multiple imaginary reference positioning lines extending along a first direction. At least one optical microstructure set is disposed on the first surface corresponding to each imaginary reference positioning line. Each optical microstructure set includes multiple rod-shaped microstructures, and some of the rod-shaped microstructures on multiple imaginary reference positioning lines on the first surface form a pattern microstructure group. When looking down at the first surface, a perpendicular bisector of a boundary line between each rod-shaped microstructure in the pattern microstructure group and the first surface all passes through a center point of a light-emitting surface of a light-emitting element in a light source.

12 Claims, 10 Drawing Sheets

LIGHT GUIDE PLATE AND LIGHT SOURCE DEVICE

CROSS-REFERENCE TO RELATED APPLICATION

This application claims the priority benefit of Taiwan application serial no. 113137329, filed on Sep. 30, 2024. The entirety of the above-mentioned patent application is hereby incorporated by reference herein and made a part of this specification.

BACKGROUND

Technical Field

The disclosure relates to an optical component and an optical device, and particularly relates to a light guide plate and a light source device.

Description of Related Art

Now there are mainly two types of light source devices, which are edge-lit light source devices and direct-lit light source devices. An specific edge-lit light source device has a light guide plate and a light source disposed on a light incident surface of the light guide plate. The light guide plate is used to guide the light emitted by the light source toward a light-emitting surface of the light guide plate so as to emit light. Generally, multiple optical microstructures may be formed on a surface of the light guide plate to display a specific pattern, thereby forming a light source device with pattern effects.

However, according to the existing technology, the pattern effects that can be presented by this type of light source device are mostly two-dimensional, and three-dimensional visual effects are not possible.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

To achieve one or part or all of the above objective or other objectives, an exemplary embodiment of the disclosure provides a light guide plate. The light guide plate is configured to guide multiple light beams emitted by a light source, and the light guide plate has a light incident surface and a first surface. The first surface is connected to the light incident surface. The first surface has multiple imaginary reference positioning lines extending along a first direction, and the first direction is parallel to the light incident surface. For each of the imaginary reference positioning lines, at least one optical microstructure set is provided correspondingly on the first surface. Each optical microstructure set includes multiple rod-shaped microstructures. Each of the rod-shaped microstructures has an optical surface for guiding the light beam, and the optical surface intersects the first surface on a boundary line. Some of the rod-shaped microstructures on the imaginary reference positioning lines on the first surface form a pattern microstructure group. When looking down at the first surface, a perpendicular bisector of the boundary line of each of the rod-shaped microstructures in the pattern microstructure group all passes through a center point of a light-emitting surface of a light-emitting element in the light source, and the optical surfaces of some of the rod-shaped microstructures in the pattern microstructure group are not parallel to each other. On each imaginary reference positioning line, the number of the at least one optical microstructure set is set based on the number of the rod-shaped microstructures in the pattern microstructure group located on the each imaginary reference positioning line. The boundary line of the rod-shaped microstructure in any one of the at least one optical microstructure set is correspondingly parallel to the boundary line of one of the rod-shaped microstructures in the pattern microstructure group located on the same imaginary reference positioning line, and the boundary lines of the rod-shaped microstructures in the same one of the at least one optical microstructure set are parallel to each other.

To achieve one or part or all of the above objective or other objectives, an exemplary embodiment of the disclosure provides a light source device. The light source device includes a light source and a light guide plate. The light guide plate is configured to guide multiple light beams emitted by the light source, and the light guide plate has a light incident surface and a first surface. The first surface is connected to the light incident surface. The first surface has multiple imaginary reference positioning lines extending along a first direction, and the first direction is parallel to the light incident surface. For each of the imaginary reference positioning lines, at least one optical microstructure set is provided correspondingly on the first surface. Each optical microstructure set includes multiple rod-shaped microstructures. Each of the rod-shaped microstructures has an optical surface for guiding the light beam, and the optical surface intersects the first surface on a boundary line. Some of the rod-shaped microstructures on the imaginary reference positioning lines on the first surface form a pattern microstructure group. When looking down at the first surface, a perpendicular bisector of the boundary line of each of the rod-shaped microstructures in the pattern microstructure group all passes through a center point of a light-emitting surface of a light-emitting element in the light source. On each imaginary reference positioning line, the number of the at least one optical microstructure set is set based on the number of the rod-shaped microstructures in the pattern microstructure group located on the each imaginary reference positioning line. The boundary line of the rod-shaped microstructure in any one of the at least one optical microstructure set is correspondingly parallel to the boundary line of one of the rod-shaped microstructures in the pattern microstructure group located on the same imaginary reference positioning line, and the boundary lines of the rod-shaped microstructures in the same one of the at least one optical microstructure set are parallel to each other.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces," and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
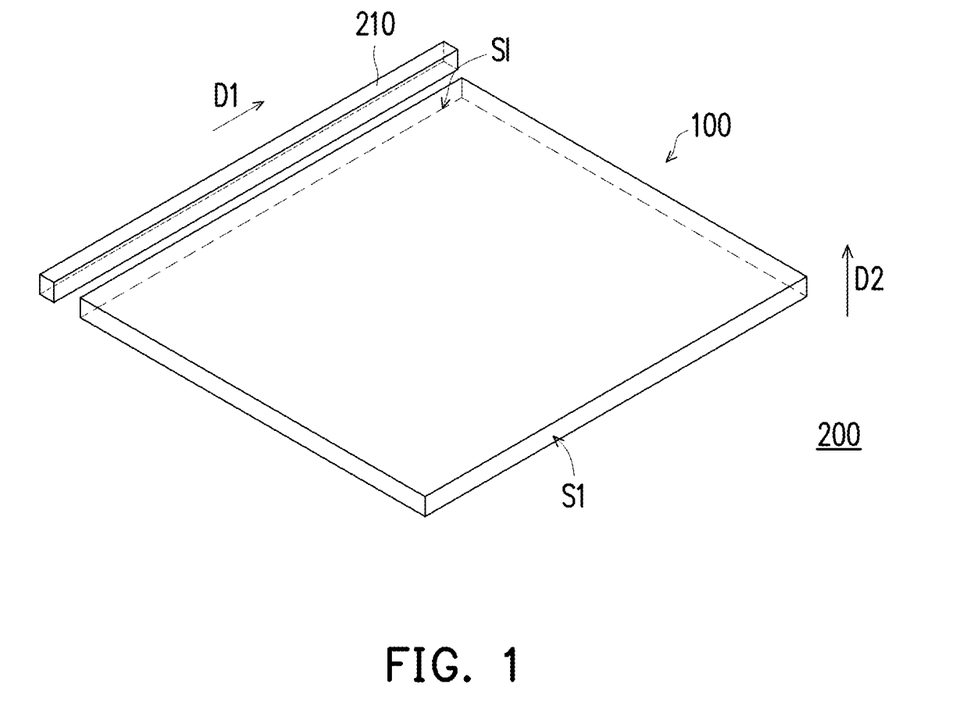
FIG. 1 is a schematic diagram showing the structure of a light source device according to an embodiment of the disclosure.
Figure 2A:
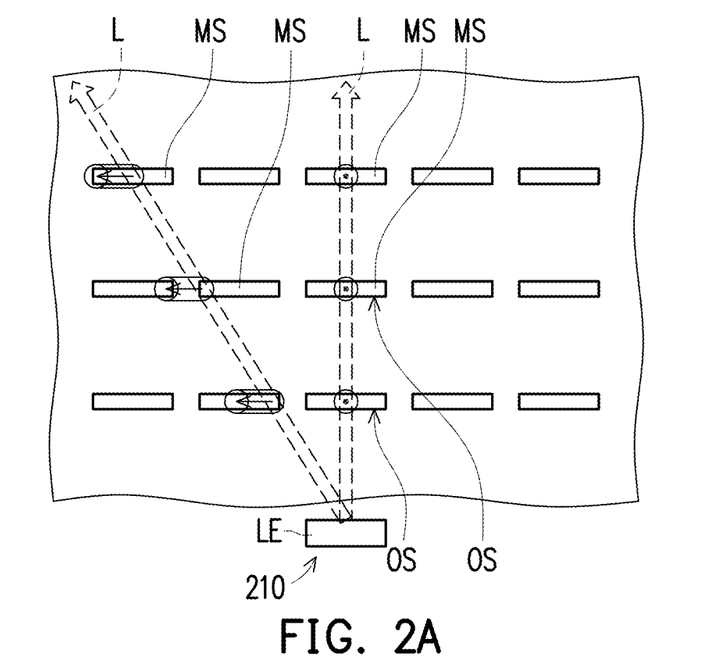
FIG. 2A is a schematic diagram showing one distribution of the optical microstructure set in the light guide plate of the light source device in FIG. 1.
Figure 2B:
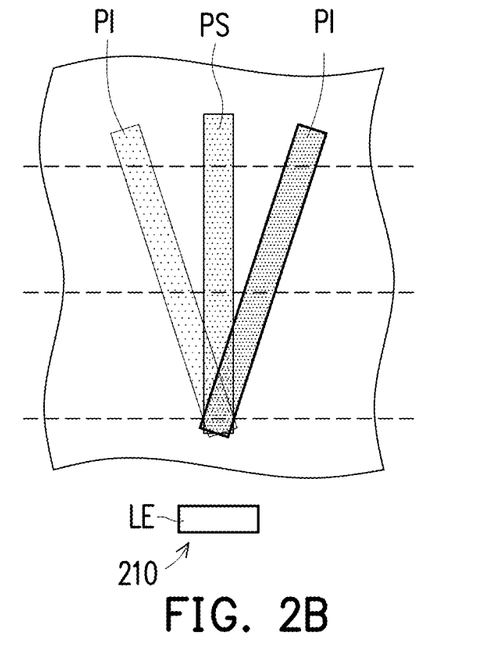
FIG. 2B is a schematic diagram showing the patterns seen when the light source device in FIG. 2A is viewed from different viewing angles.
Figure 2C:
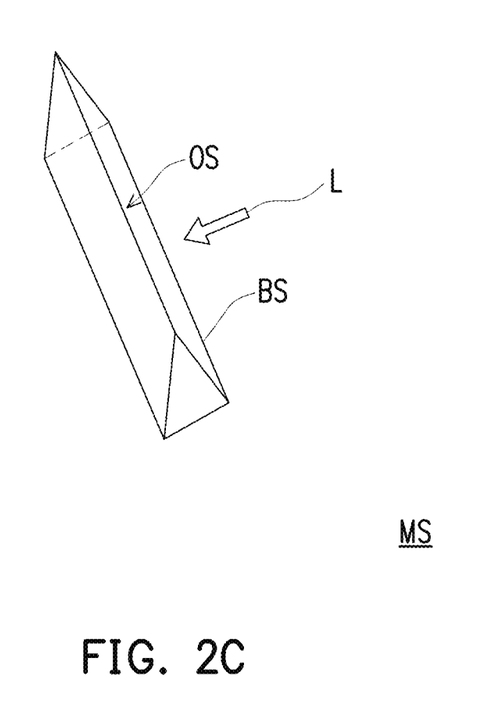
FIG. 2C is a schematic diagram showing the structure of the rod-shaped microstructure in FIG. 2A.

FIG. 1 is a schematic diagram showing the structure of a light source device according to an embodiment of the disclosure. FIG. 2A is a schematic diagram showing one distribution of the optical microstructure set in the light guide plate of the light source device in FIG. 1. FIG. 2B is a schematic diagram showing the patterns seen when the light source device in FIG. 2A is viewed from different viewing angles. FIG. 2C is a schematic diagram showing the structure of the rod-shaped microstructure in FIG. 2A. Referring to FIG. 1, a light source device 200 of this embodiment includes a light guide plate 100 and a light source 210. The light source 210 may include at least one light-emitting element LE. For example, as shown in FIG. 2A, in this embodiment, the light source 210 may be one light-emitting element LE, which is configured to provide multiple light beams L. Specifically, the light-emitting element LE is, for example, a light-emitting diode (LED) or other types of light-emitting elements. For example, in this embodiment, the light guide plate 100 is configured to guide the multiple light beams L emitted by the light source 210, and the light guide plate 100 includes multiple rod-shaped microstructures MS that enable the viewer to see a specific image with stereoscopic visual effects. In the embodiment of FIG. 2A, the specific stereoscopic image seen by the left and right eyes of the viewer is, for example, a straight line with stereoscopic visual effects. Therefore, when the light source device 200 switches the light source 210 on, the light source device 200 can display the specific image.

More specifically, as shown in FIG. 1, the light guide plate 100 has a light incident surface S1 and a first surface S1. The first surface S1 is connected to the light incident surface S1, and the rod-shaped microstructures MS are located on the first surface S1. For example, in this embodiment, the first surface S1 is, for example, the lower surface of the light guide plate 100. In other words, as shown in FIG. 2A, in this embodiment, the multiple rod-shaped microstructures MS are located on the lower surface of the light guide plate 100 (that is, the surface of the light guide plate 100 away from the viewer).

Specifically, referring to FIG. 2A to FIG. 2C, in this embodiment, as shown in FIG. 2C, an optical surface OS of the rod-shaped microstructure MS used for guiding the light beams L is, for example, a plane surface, which reflects the light beams L with the same incident angle toward the same direction. Furthermore, as shown in FIG. 2A, according to the orthographic projection of the rod-shaped microstructures MS and the light beams L on the first surface S1, the light beams L (reflected by the rod-shaped microstructures MS) are emitted in the normal direction (the direction perpendicular to the first surface S1) when the incident direction of the light beams L is perpendicular to the optical surfaces OS of the rod-shaped microstructure MS. Furthermore, the light beams L (reflected by the rod-shaped microstructures MS) are emitted in different oblique directions, depending on different incident angles of the light beams L, when the incident direction of the light beams L is not perpendicular to the optical surfaces OS of the rod-shaped microstructures MS.

Specifically, some of the rod-shaped microstructures MS disposed on the first surface S1 form a pattern microstructure group PG, and the pattern microstructure group PG may be arranged into a combination pattern. The optical surface OS of each rod-shaped microstructure MS intersects the first surface S1 on a boundary line BS (as shown in FIG. 2C). When looking down at the first surface S1, a perpendicular bisector of the boundary line BS of each rod-shaped microstructure MS in the pattern microstructure group PG all passes through a center point of a light-emitting surface LS of the same light-emitting element LE in the light source 210. That is to say, in this embodiment, the three rod-shaped microstructures MS directly facing the light-emitting element LE form the pattern microstructure group PG, as shown in FIG. 2A.

Furthermore, as shown in FIG. 2A and FIG. 2B, the pattern microstructure group PG in this embodiment is arranged into an extended straight line directly facing the light-emitting element LE. Therefore, the boundary lines BS of the rod-shaped microstructures MS in the pattern microstructure group PG are all parallel to the light incident surface S1. Thus, in the case where the rod-shaped microstructures MS parallel to the light incident surface S1 are disposed all over the light guide plate 100, the viewer can see the light beams L emitted in the normal direction, as shown by the straight line pattern PS in FIG. 2B, when viewing the light source device 200 from the normal viewing angle (the direction perpendicular to the first surface S1). Additionally, when the viewer views the light source device 200 from a non-normal viewing angle, only the rod-shaped microstructures MS located at positions that form specific angles with the light beams L can reflect light to the human eyes, as shown in FIG. 2A. Therefore, the viewer only sees the light beams L emitted in a non-normal direction, as indicated by the oblique straight line pattern P1 in FIG. 2B. That is, the image seen by the viewer varies according to the viewing angle. Furthermore, since there is a certain spacing between the left and right eyes of the viewer (about 65 millimeters), the actual viewing angles of the left and right eyes are slightly different. Thus, the images seen by the left and right eyes are similar but slightly different. For example, the closer to the light source 210, the smaller the difference, and vice versa, as shown in FIG. 2B. When actually viewing, the left and right eyes see straight lines at different inclination angles (for example, the straight line pattern PS and the oblique straight line pattern P1 in FIG. 2B), and the closer to the light source 210, the smaller the spacing between the two straight lines. Then, the human brain combines the images seen by the left and right eyes, producing stereoscopic visual effects (specific stereoscopic pattern) of a straight line extending into the light guide plate 100 with a depth of field. It should be particularly noted that, in this embodiment, only a single light-emitting element LE is disposed, and the light source 210 does not form a linear light source (the linear light source, for example, having multiple light-emitting elements closely arranged along the light incident surface, with the spacing between the light-emitting elements being, for example, less than 10 times the length of the light-emitting element along the arrangement direction), thereby allowing the viewer to see a straight line with stereoscopic visual effects, which is different from a general light source device with a linear light source.

The following further describes how the light source device 200 displays stereoscopic visual effects with a depth of field, with reference to FIG. 3A to FIG. 4E.

Figure 3A:
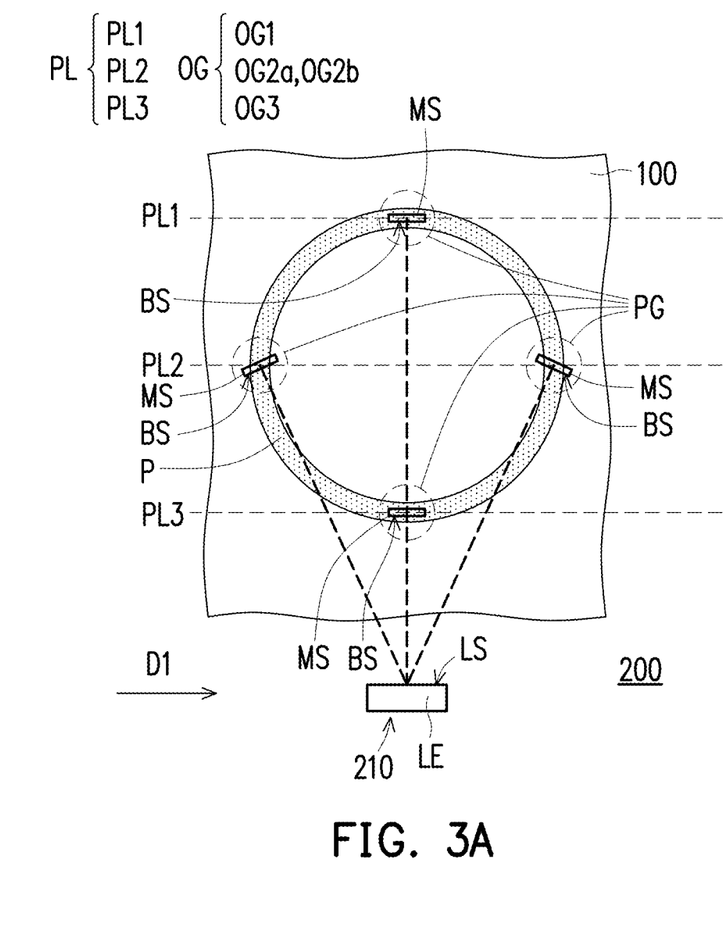
FIG. 3A is a schematic diagram showing one pattern of the light source device in FIG. 1 and the distribution of the corresponding pattern microstructure group.
Figure 3B:
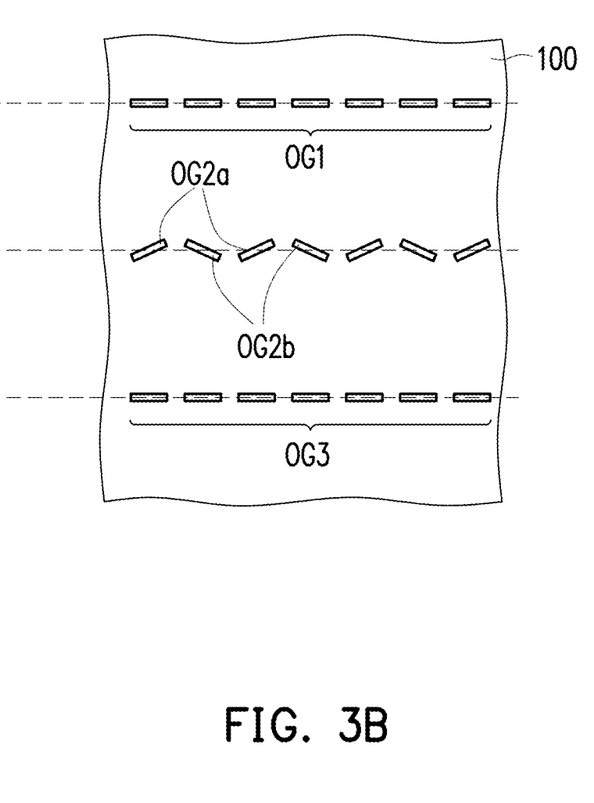
FIG. 3B is a schematic diagram showing the distribution of each optical microstructure set of the light source device in FIG. 3A.
Figure 4A:
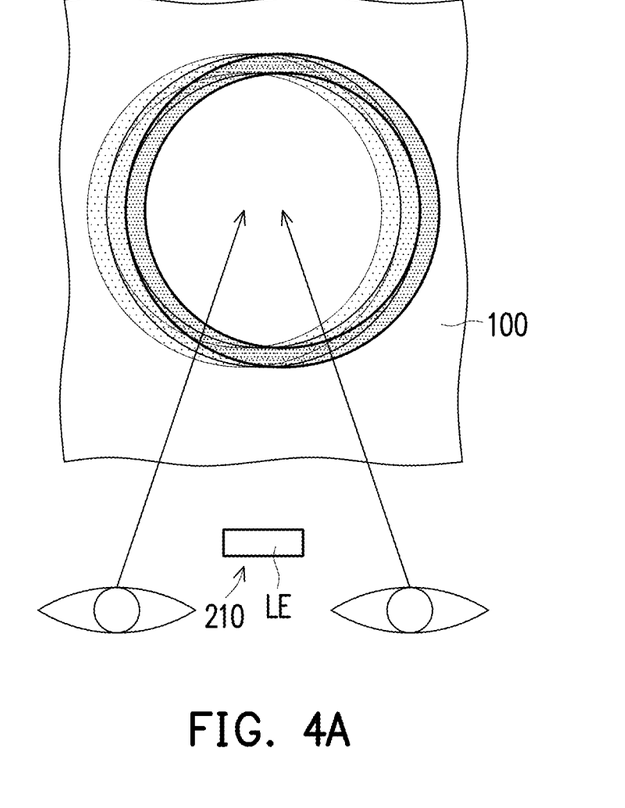
FIG. 4A is a schematic diagram showing the patterns seen when the light source device in FIG. 3A is viewed from different viewing angles.
Figure 4B:
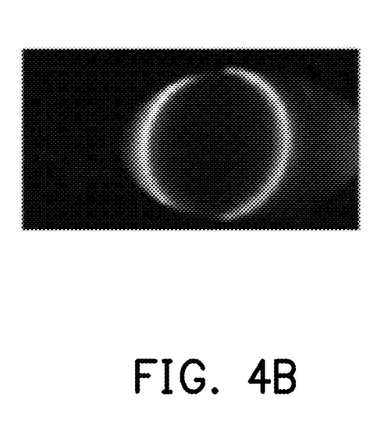
FIG. 4B to FIG. 4D are schematic diagrams showing the visual effects when the light source device in FIG. 3A is viewed from different viewing angles.
Figure 4C:
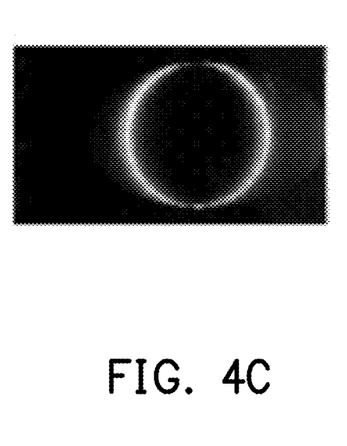
Figure 4D:
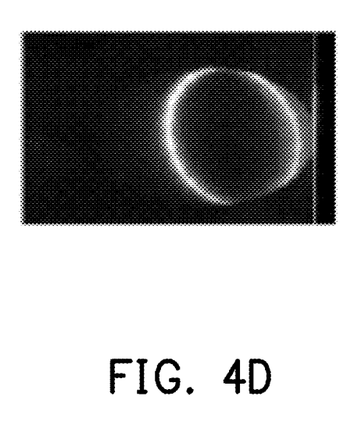

FIG. 3A is a schematic diagram showing one pattern of the light source device in FIG. 1 and the distribution of the corresponding pattern microstructure group. FIG. 3B is a schematic diagram showing the distribution of each optical microstructure set of the light source device in FIG. 3A. FIG. 4A is a schematic diagram showing the patterns seen when the light source device in FIG. 3A is viewed from different viewing angles. FIG. 4B to FIG. 4D are schematic diagrams showing the visual effects when the light source device in FIG. 3A is viewed from different viewing angles.

As shown in FIG. 1, FIG. 3A, and FIG. 3B, in this embodiment, the first surface S1 has multiple imaginary reference positioning lines PL extending along the first direction D1. The first direction D1 is parallel to the light incident surface S1, and the normal direction of the light guide plate 100 (e.g., the first surface S1) is defined as the second direction D2. Specifically, in this embodiment, for each of the imaginary reference positioning lines PL1, PL2, and PL3, at least one optical microstructure set OG is provided correspondingly on the first surface S1 of the light guide plate 100. For example, an optical microstructure set OG1 is disposed on the imaginary reference positioning line PL1, optical microstructure sets OG2a and OG2b are disposed on the imaginary reference positioning line PL2, and an optical microstructure set OG3 is disposed on the imaginary reference positioning line PL3.

Each optical microstructure set OG includes multiple rod-shaped microstructures MS. Each rod-shaped microstructure MS has the optical surface OS for guiding the light beams L, and each optical surface OS intersects the first surface S1 on the boundary line BS (as shown in FIG. 2C). Furthermore, as shown in FIG. 3A, in this embodiment, some of the rod-shaped microstructures MS disposed on the multiple imaginary reference positioning lines PL on the first surface S1 form a pattern microstructure group PG. The pattern microstructure group PG is arranged in a circular shape (combination pattern P). Specifically, in this embodiment, as shown in FIG. 3A, when looking down at the first surface S1, the perpendicular bisector of the boundary line BS of each rod-shaped microstructure MS in the pattern microstructure group PG all passes through the center point of the light-emitting surface LS of the same light-emitting element LE in the light source 210.

Further, in this embodiment, on each of the imaginary reference positioning lines PL1, PL2, and PL3, the number of the at least one optical microstructure set OG is set based on the number of the rod-shaped microstructures MS of the pattern microstructure group PG located on each of the imaginary reference positioning lines PL1, PL2, and PL3. For ease of illustration, in this embodiment, the imaginary reference positioning line PL1 is, for example, located at the uppermost edge of the circle formed by the pattern microstructure group PG, the imaginary reference positioning line PL2 is, for example, located at the middle of the circle formed by the pattern microstructure group PG, and the imaginary reference positioning line PL3 is, for example, located at the lowermost edge of the circle formed by the pattern microstructure group PG. For instance, as shown in FIG. 3A, in this embodiment, on each of the imaginary reference positioning lines PL1, PL2, and PL3 of the light guide plate 100, the number of the at least one optical microstructure set OG is equal to the number of the rod-shaped microstructures MS of the pattern microstructure group PG located on each of the imaginary reference positioning lines PL1, PL2, and PL3. For example, as shown in FIG. 3A, in this embodiment, there is one rod-shaped microstructure MS of the pattern microstructure group PG disposed on each of the imaginary reference positioning lines PL1 and PL3. Therefore, the number of optical microstructure sets OG disposed on each of the imaginary reference positioning lines PL1 and PL3 is one (that is, optical microstructure set OG1 and optical microstructure set OG3). There are two rod-shaped microstructures MS of the pattern microstructure group PG disposed on the imaginary reference positioning line PL2. Therefore, the number of optical microstructure sets OG disposed on the imaginary reference positioning line PL2 is 2 (that is, optical microstructure sets OG2a and OG2b).

To be more specific, in this embodiment, the area where the pattern microstructure group PG is disposed is covered by the light emission angle area of the light-emitting element LE of the light source 210. Besides, the rod-shaped microstructures MS of the pattern microstructure group PG are located at different positions, and as the position varies, the angle between the optical surface OS of the rod-shaped microstructure MS and the light incident surface S1 also varies accordingly. In other words, the optical surfaces OS of some of the rod-shaped microstructures MS in the pattern microstructure group PG may not be parallel to each other. As shown in FIG. 3A, for example, the optical surfaces OS (boundary lines BS) of the rod-shaped microstructures MS in the optical microstructure sets OG2a and OG2b are not parallel to each other.

Furthermore, as shown in FIG. 3B, in this embodiment, multiple rod-shaped microstructures MS of each optical microstructure set OG of the light guide plate 100 are disposed on the corresponding reference positioning line PL, and are distributed across the entire light guide plate 100 along the corresponding reference positioning line PL. That is to say, on each of the imaginary reference positioning lines PL1, PL2, and PL3, the length of the setting range of the rod-shaped microstructures MS of the at least one optical microstructure set OG on the light guide plate 100 in the first direction D1 is equal to the length of the light incident surface S1 in the first direction D1. Additionally, in this embodiment, the optical surfaces OS of the rod-shaped microstructures MS in the same optical microstructure set OG are parallel to each other. That is to say, the optical surface OS of the rod-shaped microstructure MS in any one of the at least one optical microstructure set OG is correspondingly parallel to the optical surface OS of one of the rod-shaped microstructures MS in the pattern microstructure group PG located on the same imaginary reference positioning line PL (that is, the rod-shaped microstructure MS in the pattern microstructure group PG may also be the rod-shaped microstructure MS in the at least one optical microstructure set OG). In other words, each optical microstructure set OG includes one of the rod-shaped microstructures MS in the pattern microstructure group PG. Furthermore, as shown in FIG. 3B, in this embodiment, when the number of the rod-shaped microstructures MS in the pattern microstructure group PG on one of the imaginary reference positioning lines PL on the light guide plate 100 is greater than or equal to 2, the rod-shaped microstructures MS in different sets of the at least one optical microstructure set OG are arranged alternately along the first direction D1. That is, as shown in FIG. 3B, in this embodiment, the rod-shaped microstructures MS in the optical microstructure set OG2a and the rod-shaped microstructures MS in the optical microstructure set OG2b are arranged alternately along the first direction D1.

Thus, by disposing the rod-shaped microstructures MS of the pattern microstructure group PG and the corresponding optical microstructure sets OG on the light guide plate 100, and designing the angle between the optical surface OS and the light incident surface S1, the light beams L can be reflected by the rod-shaped microstructures MS to leave the light guide plate 100 and present a preset specific pattern, as shown in FIG. 4A. In addition, different specific patterns can be seen from different viewing angles. Furthermore, due to the spacing between human eyes, the viewer can see overlapping patterns, resulting in a specific stereoscopic image with stereoscopic visual effects (depth of field). As shown in FIG. 4B to FIG. 4D, when the viewer views the light source device 200 from different viewing angles, the pattern effects of the light image (specific pattern) seen by the viewer change according to the different viewing angles, which further enhances the depth of field effect.

Figure 4E:
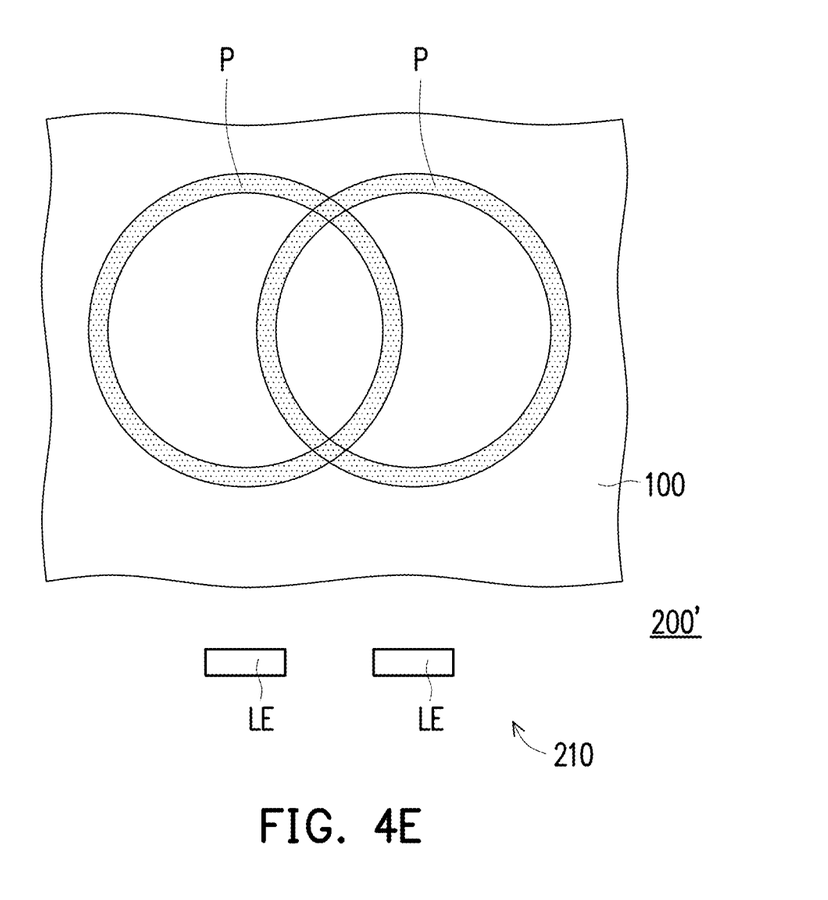
FIG. 4E is a schematic diagram showing the light source device in FIG. 3A provided with multiple light-emitting elements.

Further, FIG. 4E is a schematic diagram showing the light source device in FIG. 3A provided with multiple light-emitting elements. As shown in FIG. 4E, in another embodiment, the number of the light-emitting elements LE in the light source 210 is 2. Since other rod-shaped microstructures MS with optical surfaces OS parallel to the optical surfaces OS of the rod-shaped microstructures MS of the pattern microstructure group PG are also distributed on the light guide plate 100, thus, the light-emitting elements LE at different positions respectively have the pattern microstructure groups PG corresponding thereto, and when the light source 210 is turned on, respectively present combination patterns P. In other words, when the light source 210 turns on multiple light-emitting elements LE, the light source device 200' can display multiple specific three-dimensional patterns with a depth of field.

Figure 5A:
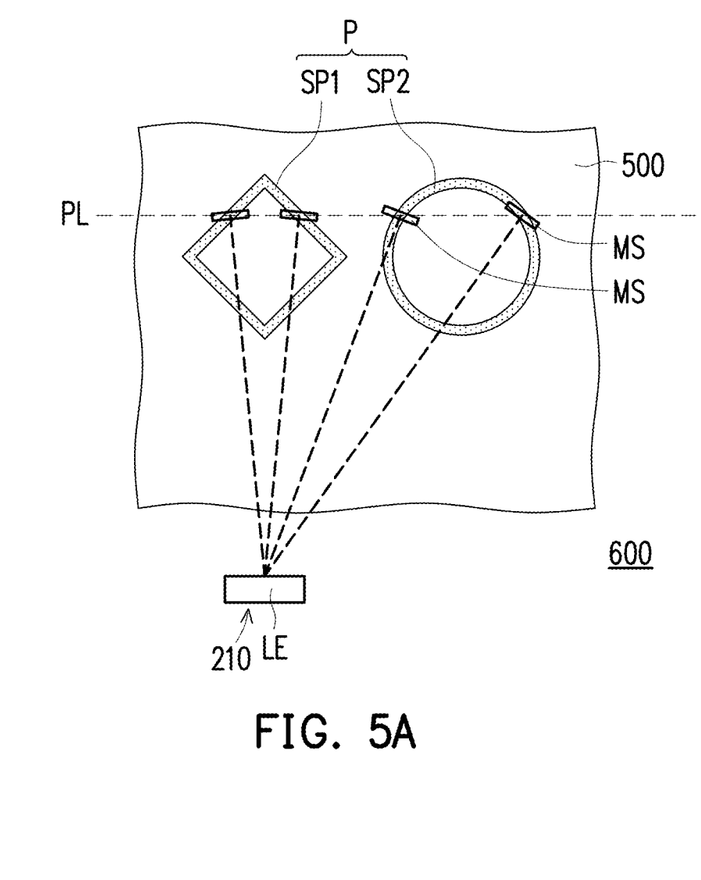
FIG. 5A is a schematic diagram showing another pattern of the light source device in FIG. 1 and the distribution of the corresponding pattern microstructure group.
Figure 5B:
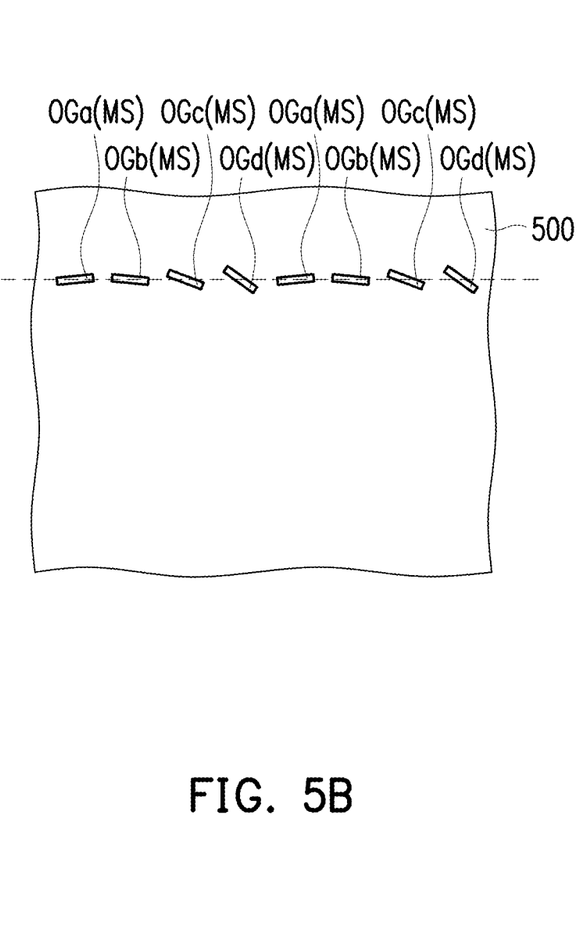
FIG. 5B is a schematic diagram showing the distribution of each optical microstructure set of the light source device in FIG. 5A.

FIG. 5A is a schematic diagram showing another pattern of the light source device in FIG. 1 and the distribution of the corresponding pattern microstructure group. FIG. 5B is a schematic diagram showing the distribution of each optical microstructure set of the light source device in FIG. 5A. Referring to FIG. 5A and FIG. 5B, the light guide plate 500 and the light source device 600 of this embodiment are similar to the light guide plate 100 and the light source device 200 of FIG. 3A and FIG. 3B, with the differences described as follows. In this embodiment, the combination patterns P formed by the pattern microstructure groups PG are not necessarily connected to each other. As shown in FIG. 5A, the combination patterns P may be arranged on the light guide plate 500 as sub-combination patterns SP1 and SP2, and the number of the rod-shaped microstructures MS in the pattern microstructure group PG disposed on one of the multiple imaginary reference positioning lines PL of the light guide plate 100 is a finite value. For example, as shown in FIG. 5A and FIG. 5B, in this embodiment, the number of the rod-shaped microstructures MS in the pattern microstructure group PG on the imaginary reference positioning line PL is 4.

Thus, in this embodiment, without considering the pattern fineness, the number of the optical microstructure sets OG may still be designed according to the imaginary reference positioning lines PL and the sub-combination patterns SP1 and SP2, and the rod-shaped microstructures MS of different sets may be arranged alternately along the first direction D1. For instance, as shown in FIG. 5A and FIG. 5B, in this embodiment, the number of the optical microstructure sets OG disposed on the imaginary reference positioning line PL is 4 (that is, optical microstructure sets OGa, OGb, OGc, and OGd), and the rod-shaped microstructures MS of the optical microstructure set OGa, the rod-shaped microstructures MS of the optical microstructure set OGb, the rod-shaped microstructures MS of the optical microstructure set OGc, and the rod-shaped microstructures MS of the optical microstructure set OGd are arranged alternately along the first direction D1.

Thus, by designing the angle of the optical surface OS of the rod-shaped microstructure MS (that is, the rod-shaped microstructure MS formed in the pattern microstructure group PG) at each position corresponding to the sub-combination patterns SP1 and SP2, as shown in FIG. 5A, the light beam L reflected by the rod-shaped microstructure MS can still present a specific three-dimensional pattern with a depth of field after leaving the light guide plate 500. As such, the arrangement of the rod-shaped microstructures MS in the pattern microstructure group PG and at least one optical microstructure set enables the light guide plate 500 and the light source device 600 to achieve effects and advantages similar to the light guide plate 100 and the light source device 200, which will not be repeated here.

Figure 6A:
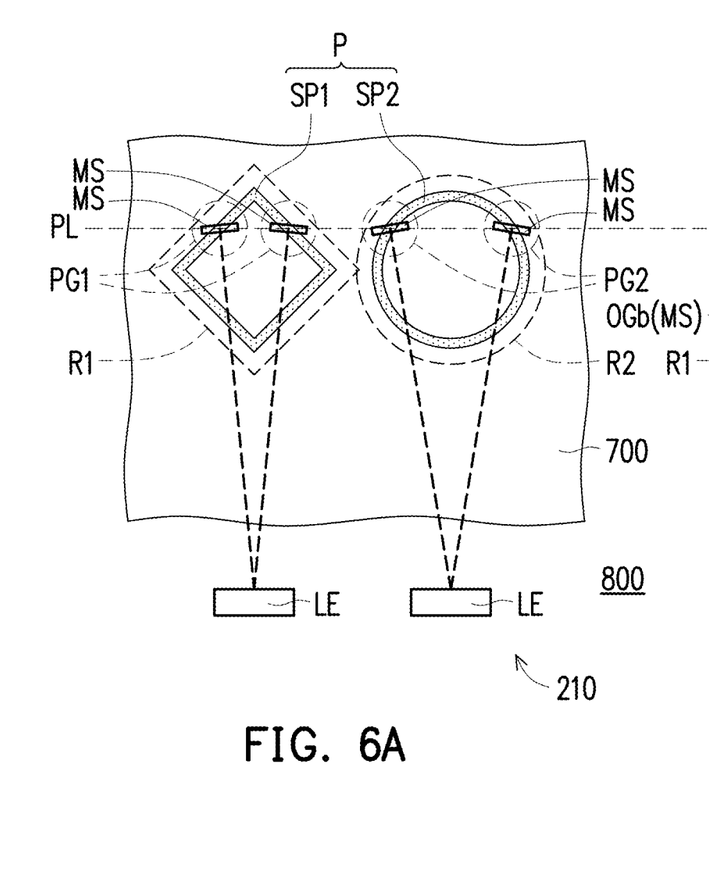
FIG. 6A is a schematic diagram showing another pattern of the light source device in FIG. 1 and the distribution of the corresponding pattern microstructure group.
Figure 6B:
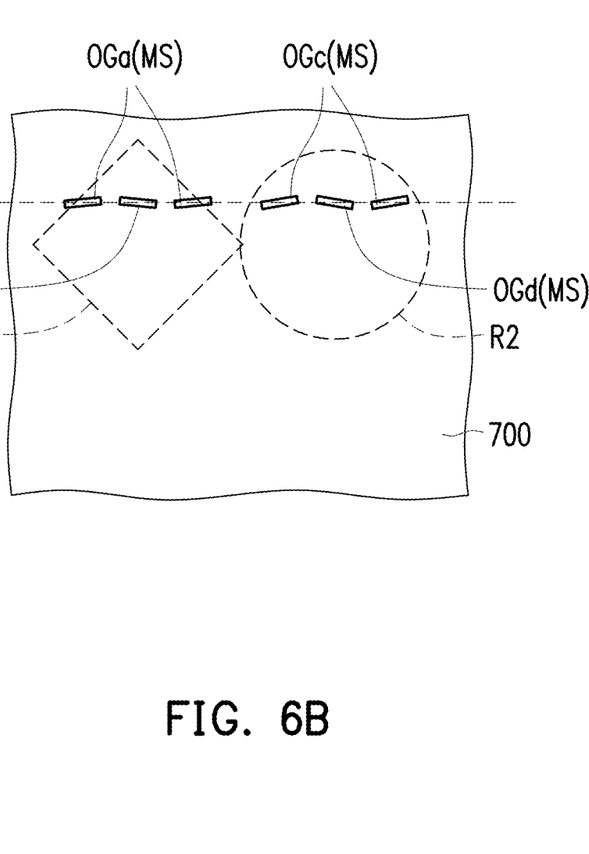
FIG. 6B is a schematic diagram showing the distribution of each optical microstructure set of the light source device in FIG. 6A.

FIG. 6A is a schematic diagram showing another pattern of the light source device in FIG. 1 and the distribution of the corresponding pattern microstructure group. FIG. 6B is a schematic diagram showing the distribution of each optical microstructure set of the light source device in FIG. 6A. Referring to FIG. 6A and FIG. 6B, the light guide plate 700 and the light source device 800 of this embodiment are similar to the light guide plate 500 and the light source device 600 of FIG. 5A and FIG. 5B, with the differences described as follows. In this embodiment, the pattern microstructure group PG is divided into multiple separated sub-pattern microstructure groups PG1 and PG2 by multiple areas arranged in the first direction D1 on the light guide plate 100. The range of each of the areas R1 and R2 is at least 1.5 times each of the sub-pattern microstructure groups PG1 and PG2. Besides, the rod-shaped microstructures MS of at least one optical microstructure set OG corresponding to the sub-pattern microstructure group PG1 are only disposed in the area R1, while the rod-shaped microstructures MS of at least one optical microstructure set OG corresponding to the sub-pattern microstructure group PG2 are only disposed in the area R2. Moreover, the light source 210 includes multiple sub-light sources 210S. The sub-light sources 210S are respectively disposed corresponding to the areas R1 and R2, and the areas R1 and R2 are respectively covered by the light emission angle areas of the sub-light sources 210S. The number of the sub-pattern microstructure groups is the same as the number of the sub-light sources. It should be particularly noted that, in this embodiment, the number of the sub-pattern microstructure groups is 2, but the disclosure is not limited thereto; in other embodiments, the number of the sub-pattern microstructure groups may be greater than 2. Furthermore, in this embodiment, on each imaginary reference positioning line PL in each of the areas R1 and R2 of the light guide plate 100, the number of the at least one optical microstructure set OG is equal to the number of the rod-shaped microstructures MS of the sub-pattern microstructure groups PG1 and PG2. When the number of the rod-shaped microstructures MS used to present the same sub-pattern microstructure group PG1, PG2 on one of the imaginary reference positioning lines PL in each of the areas R1 and R2 of the light guide plate 100 is greater than or equal to 2, the rod-shaped microstructures MS of different sets of the at least one optical microstructure set OG are arranged alternately along the first direction D1 in each area.

For example, as shown in FIG. 6B, in this embodiment, the number of the optical microstructure sets OG disposed on the imaginary reference positioning line PL in the area R1 for presenting the sub-pattern microstructure group PG1 is 2 (that is, optical microstructure sets OGa and OGb), and the rod-shaped microstructures MS of the optical microstructure set OGa and the rod-shaped microstructures MS of the optical microstructure set OGb are arranged alternately along the first direction D1. Similarly, the number of the optical microstructure sets OG disposed on the imaginary reference positioning line PL in the area R2 for presenting the sub-pattern microstructure group PG2 is 2 (that is, optical microstructure sets OGc and OGd), and the rod-shaped microstructures MS of the optical microstructure set OGc and the rod-shaped microstructures MS of the optical microstructure set OGd are arranged alternately along the first direction D1.

As shown in FIG. 6A and FIG. 6B, the sub-pattern microstructure groups PG1 and PG2 are distributed in different areas R1 and R2 of the light guide plate 100, which ensures that the arrangement of the rod-shaped microstructures MS of the optical microstructure set corresponding to the sub-pattern microstructure group PG1 and the arrangement of the rod-shaped microstructures MS of the optical microstructure set corresponding to the sub-pattern microstructure group PG2 do not interfere with each other, thereby further ensuring the fineness of the pattern. Moreover, by utilizing the arrangement described in each embodiment above, the light guide plate 700 and the light source device 800 can achieve effects and advantages similar to the above embodiments, which will not be repeated here.

Figure 7A:
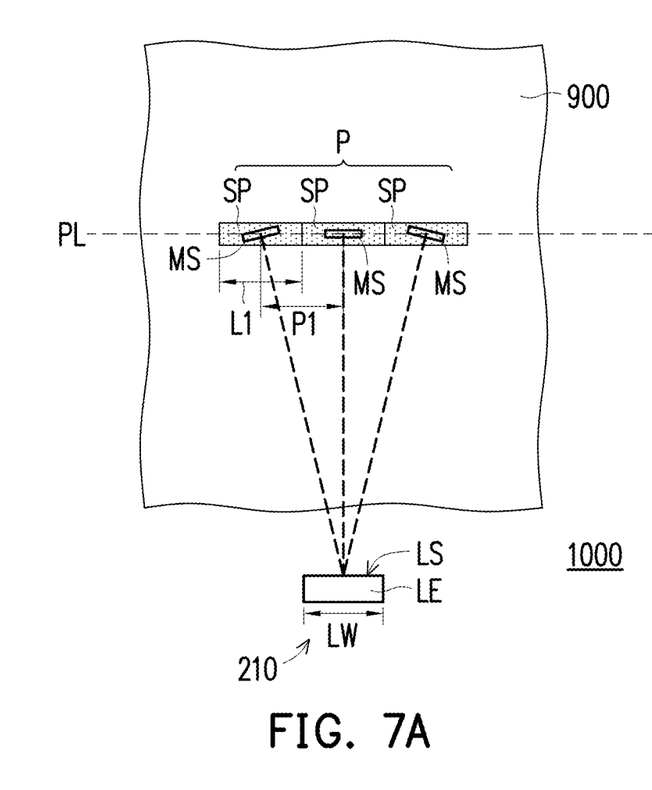
FIG. 7A is a schematic diagram showing one pattern of the light source device in FIG. 1 and the distribution of the corresponding pattern microstructure group.
Figure 7B:
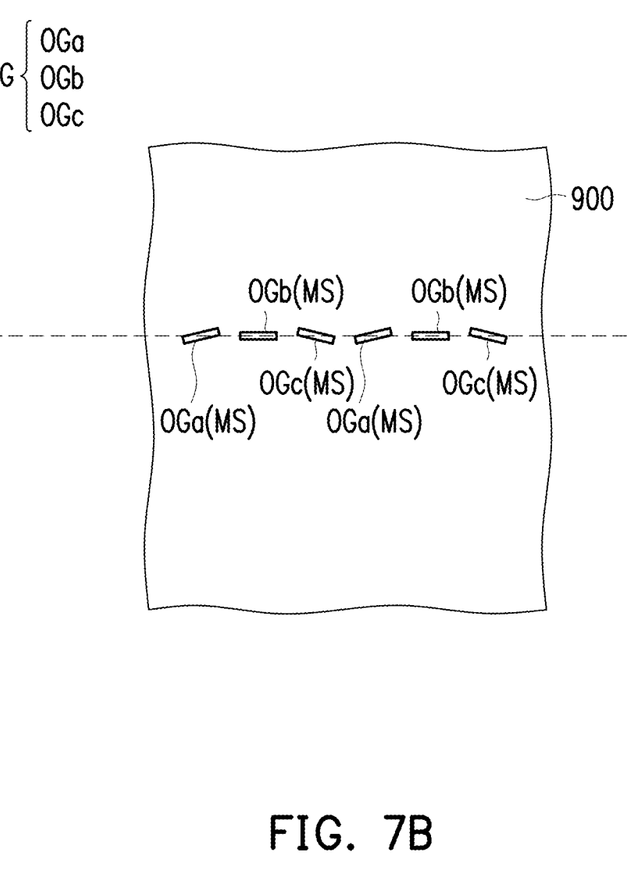
FIG. 7B is a schematic diagram showing the distribution of each optical microstructure set of the light source device in FIG. 7A.

FIG. 7A is a schematic diagram showing one pattern of the light source device 200 in FIG. 1 and the distribution of the corresponding pattern microstructure group. FIG. 7B is a schematic diagram showing the distribution of each optical microstructure set of the light source device in FIG. 7A. Referring to FIG. 7A and FIG. 7B, the light guide plate 900 and the light source device 1000 of this embodiment are similar to the light guide plate 100 and the light source device 200 of FIG. 3A and FIG. 3B, with the differences described as follows. In this embodiment, the specific stereoscopic image is a horizontal straight line pattern. That is, the specific pattern intended to be seen by the human eyes is parallel to the first direction D1. To prevent disposing too many rod-shaped microstructures MS of the pattern microstructure group PG on the same imaginary reference positioning line PL, in this embodiment, the pattern microstructure group PG includes multiple segmented pattern microstructures on one of the imaginary reference positioning lines PL. The multiple segmented pattern microstructures are respectively located at the center points of multiple segmented patterns SP. That is, the spacing P1 between the multiple segmented pattern microstructures in the first direction D1 is between half the length LW of the light-emitting surface LS of the light source 210 and three times the length LW of the light-emitting surface LS of the light-emitting element LE of the light source 210. On one of the imaginary reference positioning lines PL, the number of the at least one optical microstructure set OG is equal to the number of the multiple segmented pattern microstructures, and the rod-shaped microstructures MS of different sets are arranged alternately along the first direction D1. The spacing between adjacent rod-shaped microstructures MS on the same imaginary reference positioning line PL is less than the spacing P1.

For instance, as shown in FIG. 7A and FIG. 7B, in this embodiment, the number of the optical microstructure sets OG disposed on the imaginary reference positioning line PL is 3 (that is, optical microstructure sets OGa, OGb, and OGc), and the rod-shaped microstructures MS of the optical microstructure set OGa, the rod-shaped microstructures MS of the optical microstructure set OGb, and the rod-shaped microstructures MS of the optical microstructure set OGc are arranged alternately along the first direction D1.

As shown in FIG. 7A and FIG. 7B, the arrangement of the light guide plate 900 and the light source device 1000 enables the light beam L reflected by the rod-shaped microstructures MS to present a specific stereoscopic image with a depth of field after leaving the light guide plate 700. Thus, with the arrangement of the rod-shaped microstructures MS, the light guide plate 900 and the light source device 1000 can achieve effects and advantages similar to the light guide plate 100 and the light source device 200, which will not be repeated here.

In summary, the embodiments of the disclosure have at least one of the following advantages or effects. According to the embodiments of the disclosure, the angle between the optical surface of the rod-shaped microstructure (that is, the rod-shaped microstructure formed in the pattern microstructure group) at each position corresponding to the specific pattern and the incident direction of the light beam L is designed so that the light guide plate and the light source device can present a specific three-dimensional pattern with a depth of field.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention," or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, configured to guide a plurality of light beams emitted by a light source, the light guide plate having a light incident surface and a first surface, wherein the first surface is connected to the light incident surface, the first surface has a plurality of imaginary reference positioning lines extending along a first direction, and the first direction is parallel to the light incident surface, wherein for each of the plurality of imaginary reference positioning lines, at least one optical microstructure set is provided correspondingly on the first surface, wherein each of the at least one optical microstructure set comprises a plurality of rod-shaped microstructures, each of the rod-shaped microstructures has an optical surface for guiding the light beam, and the optical surface intersects the first surface on a boundary line, wherein some of the rod-shaped microstructures on the plurality of imaginary reference positioning lines on the first surface form a pattern microstructure group, and when looking down at the first surface, a perpendicular bisector of the boundary line of each of the rod-shaped microstructures in the pattern microstructure group all passes through a center point of a light-emitting surface of a light-emitting element in the light source, and the optical surfaces of some of the rod-shaped microstructures in the pattern microstructure group are not parallel to each other, and on each of the plurality of imaginary reference positioning lines, the number of the at least one optical microstructure set is set based on the number of the rod-shaped microstructures in the pattern microstructure group located on the each of the plurality of imaginary reference positioning lines, the boundary line of the rod-shaped microstructure in any one of the at least one optical microstructure set is correspondingly parallel to the boundary line of one of the rod-shaped microstructures in the pattern microstructure group located on the same one of the plurality of imaginary reference positioning lines, and the boundary lines of the plurality of rod-shaped microstructures in the same one of the at least one optical microstructure set are parallel to each other.

2. The light guide plate according to claim 1, wherein on each of the plurality of imaginary reference positioning lines, the number of the at least one optical microstructure set is equal to the number of the rod-shaped microstructures in the pattern microstructure group located on each of the plurality of imaginary reference positioning lines.

3. The light guide plate according to claim 1, wherein on one of the plurality of imaginary reference positioning lines, the rod-shaped microstructures of different sets of the at least one optical microstructure set are arranged alternately along the first direction in a case where the number of the rod-shaped microstructures in the pattern microstructure group is greater than or equal to 2.

4. The light guide plate according to claim 1, wherein on one of the plurality of imaginary reference positioning lines, the pattern microstructure group comprises a plurality of segmented pattern microstructures on the one of the plurality of imaginary reference positioning lines, and a spacing between the plurality of segmented pattern microstructures in the first direction is between half a length of the light-emitting surface of the light source and three times the length of the light-emitting surface of the light-emitting element of the light source, and on the one of the plurality of imaginary reference positioning lines, the number of the at least one optical microstructure set is equal to the number of the plurality of segmented pattern microstructures.

5. The light guide plate according to claim 1, wherein on each of the plurality of imaginary reference positioning lines, a length of a setting range of the rod-shaped microstructures in the at least one optical microstructure set in the first direction is the same as a length of the light incident surface in the first direction.

6. The light guide plate according to claim 1, wherein the pattern microstructure group is divided into a plurality of separated sub-pattern microstructure groups by a plurality of areas arranged in the first direction on the light guide plate, a range of each of the areas is at least 1.5 times each of the sub-pattern microstructure groups, and the rod-shaped microstructures of the at least one optical microstructure set in the same sub-pattern microstructure group are disposed within the same area.

7. The light guide plate according to claim 6, wherein on each of the plurality of imaginary reference positioning lines in each of the areas, the number of the at least one optical microstructure set is equal to the number of the rod-shaped microstructures in the sub-pattern microstructure group.

8. The light guide plate according to claim 6, wherein on one of the plurality of imaginary reference positioning lines in each of the areas, the rod-shaped microstructures of different sets of the at least one optical microstructure set are arranged alternately along the first direction in each of the areas in a case where the number of the rod-shaped microstructures used to present the same sub-pattern microstructure group is greater than or equal to 2.

9. A light source device, comprising:
a light source comprising at least one light-emitting element and configured to provide a plurality of light beams; and
a light guide plate having a light incident surface and a first surface, wherein the first surface is connected to the light incident surface, the light guide plate has a plurality of imaginary reference positioning lines extending along a first direction, the first direction is parallel to the light incident surface, wherein
for each of the plurality of imaginary reference positioning lines, at least one optical microstructure set is provided correspondingly on the first surface, wherein each of the at least one optical microstructure set comprises a plurality of rod-shaped microstructures, each of the rod-shaped microstructures has an optical surface for guiding the light beam, and the optical surface intersects the first surface on a boundary line, wherein some of the rod-shaped microstructures on the plurality of imaginary reference positioning lines on the first surface form a pattern microstructure group, and when looking down at the first surface, a perpendicular bisector of the boundary line of each of the rod-shaped microstructures in the pattern microstructure group all passes through a center point of a light-emitting surface of a light-emitting element in the light source, and on each of the plurality of imaginary reference positioning lines, the number of the at least one optical microstructure set is set based on the number of the rod-shaped microstructures in the pattern microstructure group located on the each of the plurality of imaginary reference positioning lines, the boundary line of the rod-shaped microstructure in any one of the at least one optical microstructure set is correspondingly parallel to the boundary line of one of the rod-shaped microstructures in the pattern microstructure group located on the same one of the plurality of imaginary reference positioning lines, and the boundary lines of the plurality of rod-shaped microstructures in the same one of the at least one optical microstructure set are parallel to each other.

10. The light source device according to claim 9, wherein an area where the pattern microstructure group is disposed is covered by a light emission angle area of the light source.

11. The light source device according to claim 9, wherein the pattern microstructure group is divided into a plurality of separated sub-pattern microstructure groups by a plurality of areas arranged in the first direction on the light guide plate, a range of each of the areas is at least 1.5 times each of the sub-pattern microstructure groups, and the rod-shaped microstructures of the at least one optical microstructure set in the same sub-pattern microstructure group are disposed within the same area.

12. The light source device according to claim 11, wherein the light source comprises a plurality of sub-light sources, each of the sub-light sources is disposed corresponding to each of the areas, and each of the areas is covered by a light emission angle area of each of the sub-light sources.

* * * * *